United States Patent [19]

Doherty

[11] Patent Number: 5,176,321
[45] Date of Patent: Jan. 5, 1993

[54] DEVICE FOR APPLYING ELECTROSTATICALLY CHARGED LUBRICANT

[75] Inventor: James E. Doherty, Barrington, Ill.

[73] Assignee: Illinois Tool Works Inc., Glenview, Ill.

[21] Appl. No.: 789,900

[22] Filed: Nov. 12, 1991

[51] Int. Cl.$^5$ .............................................. B05B 5/025
[52] U.S. Cl. ....................................... 239/3; 239/690; 239/690.1
[58] Field of Search ................ 239/3, 690, 690.1, 704, 239/708

[56] References Cited

U.S. PATENT DOCUMENTS

| | | | |
|---|---|---|---|
| 3,735,925 | 5/1973 | Benedek et al. | 239/704 |
| 4,004,733 | 1/1977 | Law | 239/3 |
| 4,255,777 | 3/1981 | Kelly | 239/704 X |
| 4,381,533 | 4/1983 | Coffee | 239/690 X |
| 4,659,012 | 4/1987 | Coffee | 239/690 X |
| 4,776,515 | 10/1988 | Michalchik | 239/3 |
| 4,788,016 | 11/1988 | Colclough et al. | 239/3 X |
| 5,044,564 | 9/1991 | Sickles | 239/690.1 |

*Primary Examiner*—Andres Kashnikow
*Assistant Examiner*—William Grant
*Attorney, Agent, or Firm*—Thomas W. Buckman; Donald J. Breh

[57] ABSTRACT

A device for electrostatically charging and dispensing a high resistivity cutting lubricant to a workpiece includes a source of high resistivity cutting lubricant and a capillary tube having an entrant end in fluid communication with the high resistivity cutting lubricant and a tapered discharge end forming a sharp point. A high voltage power supply is used for generating a high voltage of less than 5,000 volts d.c. The power supply has a positive terminal and a negative terminal. A high voltage electrode has its one end connected to the positive terminal of the power supply and has its other end operatively coupled to the discharge end of the capillary tube. A nearby grounded electrode is disposed in a spaced-apart relationship from the discharge end of the capillary tube so as to create a high electric field therebetween for electrostatically charging the lubricant. The lubricant is atomized and projected in the form of a steady and controlled stream of charged particles away from the discharge end of the capillary tube to within the vicinity of or all the way to the workpiece before the stream of charged particles bursts into an aerosol cloud of charged droplets for dispensing them onto the workpiece.

12 Claims, 3 Drawing Sheets

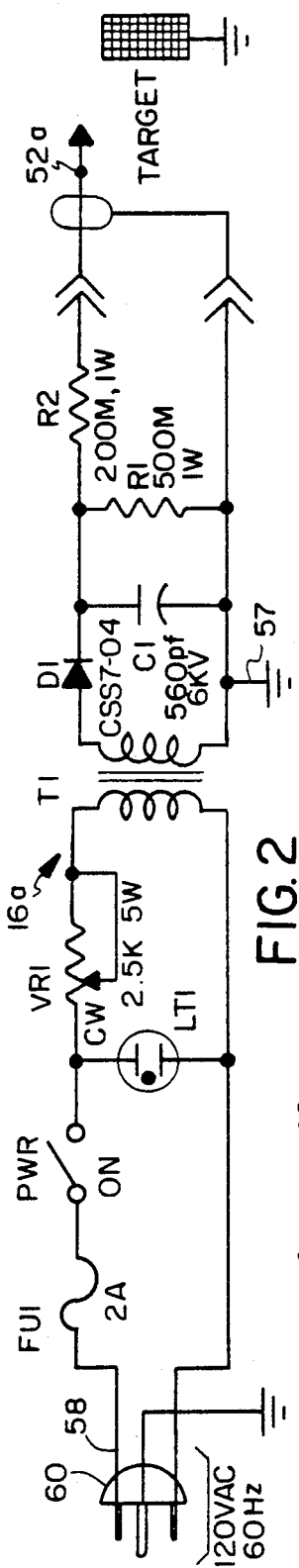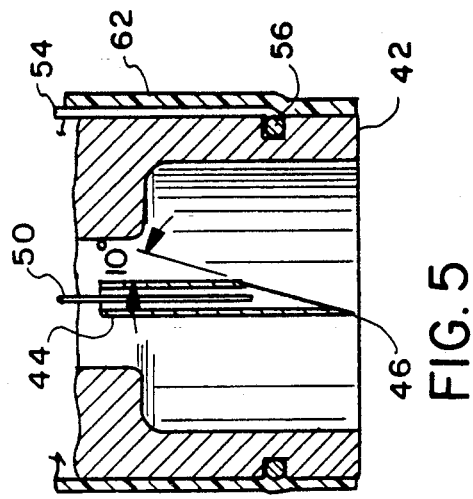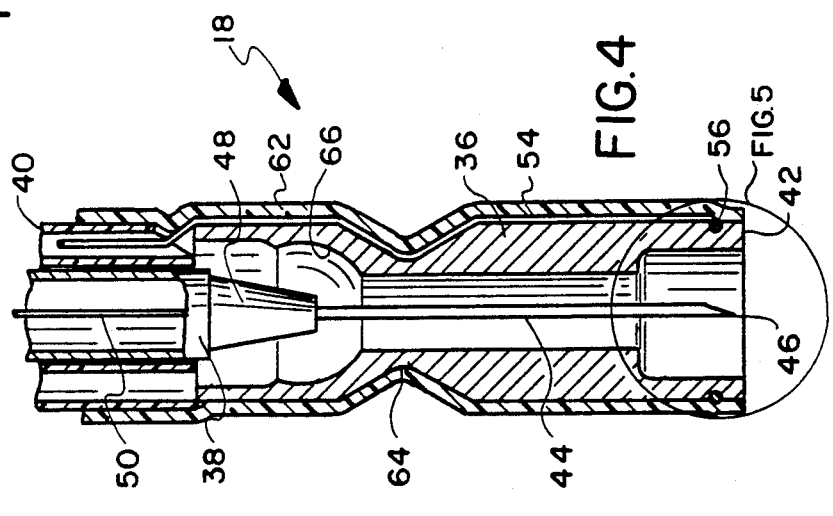

DEVICE FOR APPLYING ELECTROSTATICALLY CHARGED LUBRICANT

BACKGROUND OF THE INVENTION

1. Field of the Invention

This invention relates generally to apparatuses for spraying or coating a lubricant onto the surfaces of a cutting tool. More particularly, it relates to a device for applying electrostatically charged lubricant of a high resistivity to the active surfaces of cutting tools.

As is generally well-known in the art of machining operations such as drilling, milling, sawing and the like, when the tool is applied to the workpiece there is created large amounts of heat due to their frictional inter-engagement. This heat is highly undesirable since it leads to the shortening of the useful life of the cutting tool. In order to prolong the life of the tools, it has been known in industrial practice that special high lubricity cutting lubricants can be applied to the contact area between the tool and the workpiece. Further, it is generally known that only a small amount of such lubricants is required so as to achieve this result.

One of the current techniques is to apply the lubricant material by brushing or blowing single drops thereof, such as by using air nozzles, onto the cutting surfaces of the cutting tools. However, this prior art technique suffers from the disadvantage of being cumbersome since it is a very time-consuming process. Further, this technique also has the problem of requiring the use of multiple nozzles when the cutting tool has more than one dimension, thereby increasing its complexity and cost. In addition, there is still another disadvantage encountered with such air nozzles since they consume significant amounts of shop air which is relatively expensive.

2. Description of the Prior Art

The literature is replete with numerous types of electrostatic atomizing devices which are of limited relevancy to the instant application due to a number of factors such as the inability to be functionally operable with a moderately low high-voltage electric potential and the inability to atomize liquids with high resistivity.

In U.S. Pat. No. 3,556,255 to George F. Lomax, Jr. issued on Jan. 19, 1971, there is disclosed an apparatus for applying dry, solid lubricant particles onto the work surface of a forge tool which includes a source of solid lubricant particles, an electrostatic charging chamber and a nozzle. The source of solid particles is interconnected between a gas supply and one end of the charging chamber. The charging chamber is also connected to a potential supply. The nozzle is connected to the other end of the charging chamber for spraying charged particles onto the surface of the forge tool.

In U.S. Pat. No. 3,735,925 to Gyorgy Benedek et al. issued on May 29, 1973, there is disclosed an apparatus for electrostatically charging material to be sprayed onto a surface which includes a first electrode of a condenser having a high-voltage of 15-20 kV connected thereto and a second electrode being grounded. The second electrode is positioned opposite the first electrode at a spaced-apart interval therebetween and is covered with a dielectric. The material to be sprayed is passed through the two electrodes to create a uniform electrostatic charging effect prior to spraying.

In U.S. Pat. No. 4,776,515 to Michael Michalchik issued on Oct. 11, 1988, there is described an apparatus for generating a mist of negatively charged liquid particles which includes a liquid container, a capillary tube in fluid communication with the container, an electrode at least partially within a passage of the capillary tube and a DC power supply supplying a negative potential. The liquid is indicated to have a resistivity in the range of $1.6 \times 10^3$ to $4.0 \times 10^5$ Ohms-cm, and the negative potential is specified to have an operating range between 5 and 8 kV DC.

U.S. Pat. No. 4,004,733 to S. Edward Law issued on Jan. 25, 1977, is directed to an electrostatic spray nozzle formed of a base having a central conduit for receiving liquid under pressure and having a forwardly extending conduit to receive air under pressure, and a housing fixedly secured to the base. The housing has a forwardly extending nozzle passage and is in fluid communication with the air and liquid conduits of the base. An annular electrode is disposed within the housing and is coaxial with the nozzle passage. The electrode is operated at a relatively low voltage (i.e., 2 kV) so as to impart a high spray-cloud charge to the stream of liquid droplets formed in the nozzle passage.

U.S. Pat. No. 4,168,327 to S. Edward Law issued on Sep. 18, 1979, is directed to a space-charge controlled electrostatic spraying method which uses a low volume spray nozzle to produce finely divided, electrostatically charged particles. The charged particles are monitored to sense the value of a parameter related to their space-charge density. The particles are first deposited on a calibration target simulating the ultimate target object, and the space-charge density of the stream is varied while the degree and/or quality of the deposition on the test objects is measured. The space-charge density corresponding to the optimal deposition is thereafter maintained while the charged particles are being deposited onto the target object.

In U.S. Pat. No. 4,255,777 to Arnold J. Kelly issued on Mar. 10, 1981, there is disclosed an electrostatic charging device for electrostatically atomizing fluids into a plurality of charged droplets which includes a housing a having a chamber therein and the fluid is disposed within the chamber. First and second electrodes are disposed in a spaced-apart relationship to each other and are in liquid contact with fluid within the chamber so as to generate an electric charge. The first electrode may consist of an elongated rod with a sharp tipped end, and the second electrode may be provided with a blunt end. The first electrode is connected to a high voltage source, and the second electrode is connected via a resistor element to the opposite end of a high voltage source. The high voltage is stated to be most preferably between 100 volts to about 30 kilovolts D.C. A ground electrode is disposed externally to the housing and forms an electrostatic field so as to assist the spraying of the charged droplets. The fluid is stated to have a conductivity most preferably less than about $10^{-10}$ mho/meter.

German patent application No. P27 31 712.0 to Ronald A. Coffee filed Jul. 13, 1977, is directed to an electrostatic liquid atomizer which includes a plastic tube for housing a high voltage supply and a switch. At the front end of the tube, there is provided a bracket having a threaded hole for receiving a bottle containing the liquid to be atomized. A tubular distributor has its upper end connected to the bottom of the hole in the bracket and has its lower end connected to a plate. The plate is formed with a plurality of capillary tubes which function as a nozzle. One end of a blank wire is soldered to the capillary tube, and the other end thereof is connected to the high voltage terminal of the high voltage supply. The distributor is further inserted through the bottom of an inverted cup. A field steering electrode in the form of a metal ring is attached to the rim of the cup and is grounded by way of a grounding wire. The high voltage is in the range of 1 to 20 kV. The liquids used during the testing of the device had a resistivity between $1 \times 10^7$ and $5 \times 10^8$ Ohms-cm.

British patent No. 2,114,686B to Adrian G. Bailey et al. issued on Apr. 30, 1986, is directed to an apparatus for supplying of lubricant to a workpiece during a machining operation which includes a stationary electrically conductive lubricant discharge nozzle. A wire is connected to the nozzle for supplying an elevated electrical potential from a high voltage supply unit. The nozzle is enclosed by a molded insulating and protective shroud so that only the tip thereof is exposed. The tip is described to be preferably a relatively sharp edge. A high voltage supply unit is operated between 6–10 kV. The liquid is specified to have an electrical conductivity within the approximate range of $10^{-8}$ $Sm^{-1}$ to $10^{-3}$ $Sm^{-1}$ so as to provide satisfactory charging and atomization.

The prior art reveals that it is well known that liquids can be electrostatically atomized utilizing capillaries. The prior art patents teach that materials with low resistivity such as water and water alcohol mixtures having substantial concentrations of water or alcohol and materials with moderate resistivity such as paints and some solvent oils can be atomized and projected electrostatically. However, the prior art fails to show that materials with a very high resistivity such as kerosene and high lubricity lubricants can be electrostatically charged and atomized. This is because of the fact that there is not sufficient time for the electric charge to flow and segregate in the high resistivity liquid before drops form from the bulk liquid. Further, the high resistivity of liquid serves to retard the current flow even when very high electric potentials are applied.

As used herein, low resistivity materials refer to those with a resistivity below $10^5$ Ohm meters. Further, moderate resistivity materials refer to those with a resistivity in the range of $10^5$ to $10^8$ Ohm meters (sometimes defined as good "spraying liquids"), and high resistivity materials refer to those with a resistivity above $10^8$ Ohm meters.

SUMMARY OF THE INVENTION

Against this background, it has been discovered by the inventor that streams of very small droplets are emitted from selected points on the circumference of the ends of the metal capillaries when such high resistivity liquids are present at the end of the capillaries. These streams are emitted in a multitude of random directions. On close examination of the capillary end, it was observed that sharp aspirates existed in the region where the streams of small droplets were emitted. It was further discovered that if sharp points were purposely created at the end of the metal capillaries then atomization occurred in a steady and controlled manner.

As a result, the present invention is capable of generating a very well controlled atomization and projection which is achieved by fashioning a single point onto the capillary end. The high resistivity lubricant used in the present invention can be atomized and projected several inches in the form of a stream of charged particles from the end of the capillary to within the vicinity of or all the way to the active surfaces of the cutting tools before the stream of particles bursts to an aerosol cloud of charged droplets.

Although it is not fully understood as to how the charge is induced into the high resistivity liquids, the inventor has postulated that the charged carriers are injected into the liquid bulk when it is in contact with the very sharp tips at the capillary end. Due to this sharpness, very high electric fields will exist at these tips so that charged carriers are continually being generated. These charged carriers will not be able to escape because of the high resistivity of the liquid. Aside from these charged carriers, there exist other charged carriers which also flow through the basic electrical conduction. Thus, the relative amount of conducted charge will increase as the resistivity of the liquid decreases.

Moreover, it has been discovered that the electric field necessary to cause atomization at the sharp tip at the end of the capillary can be sustained with a relatively low high voltage when a very small nearby grounded electrode is present. The electric potential can be as low as a few thousand volts when the grounded electrode is placed only a few eighths of an inch away from the capillary end. While it is generally known that the required high electrostatic field can be produced with low electric potentials when the nearby grounded electrode of sufficient size is present, it has been found that the size, shape and location of this grounded electrode is not critical but has broad tolerances. The grounded electrode can be made to be very small in size with an arbitrary shape. The grounded electrode should be placed in contact with or buried slightly below the surface of any non-conductive components that are nearby the capillary tip. For example, a single strand or even partial loop of the smallest gauge wire is all that is needed to maintain atomization and projection of the high resistivity liquid. The effect of the grounded electrode can be achieved even though it is covered by an insulating material.

The inventor has hypothesized that the effectiveness of the small grounded electrode is because it functions as a sink for stray charged carriers which are in the vicinity of the capillary tip or on any nearby non-conducting or ungrounded conductive structural component of the device. On the one hand, it is theorized that due to the sharpness of the capillary tip the electric field that is appropriate for atomization and projection may be achieved at low electrical potentials even without the need of the grounded electrode, assuming no significant stray charges are located in the vicinity of the capillary tip. On the other hand, when there are stray charges nearby the capillary tip the sharpness of the tip is essentially blunted, thereby requiring high electrical potential to maintain the electric field necessary for atomization. This stray charge concept is supported by the evidence that once atomization and projection of the liquid has been established it will continue for several seconds before stopping when the grounded electrode is removed from the vicinity of the capillary tip. It is believed that some time is required for the stray charged carriers to be collected on the nearby surfaces and occupy the nearby volume so as to reduce the electric field at the capillary tip below the critical value.

Accordingly, it is a general object of the present invention to provide a method and a device for electrostatically charging and dispensing of a high resistivity liquid that has been traditionally unavailable.

It is an object of the present invention to provide a method and device for applying electrostatically charged lubricant of a high resistivity to the active surfaces of cutting tools.

It is another object of the present invention to provide a device for electrostatically atomizing cutting lubricant having a high resistivity into a stream of charged particles which are projected a predetermined distance from the atomization zone to within the vicinity of or all the way to the active surfaces of the cutting tools before the stream of charged particles burst into an aerosol cloud of charged droplets.

It is still another object of the present invention to provide a device for electrostatically charging and dispensing a high resistivity cutting lubricant to a workpiece which utilizes a capillary tube having a tapered discharge end forming a sharp point, high voltage electrode operatively coupled to the discharge end of the capillary tube, and a nearby grounded electrode disposed in a spaced-apart relationship from the discharge end of the capillary tube so as to create a high electric field therebetween for electrostatically charging the lubricant.

It is yet still another object of the present invention to provide a device for electrostatically charging and dispensing a high resistivity cutting lubricant to a workpiece which utilizes a high voltage power supply for generating a high voltage of less than 5,000 volts d.c.

It is still yet another object of the present invention to provide a method for electrostatically charging and dispensing a high resistivity cutting lubricant to a workpiece in which the lubricant is atomized and projected in the form of a steady and controlled stream of charged particles away from the discharging end of a capillary tube to within the vicinity of or all the way to the workpiece before the stream of charged particles bursts into an aerosol cloud of charged droplets for dispensing them onto the workpiece.

In accordance with these aims and objectives, the present invention is concerned with the provision of a method and apparatus for electrostatically charging and dispensing a high resistivity cutting lubricant to a workpiece which includes a source of high resistivity cutting lubricant and a capillary tube having an entrant end in fluid communication with the high resistivity cutting lubricant and a tapered discharge end forming a sharp point. A high voltage power supply is used to generate a high voltage of less than 5,000 volts d.c. The power supply has a positive terminal and a negative terminal.

A high voltage electrode has its one end connected to the positive or negative terminal of the power supply and has its other end operatively coupled to the discharge end of the capillary tube. A nearby grounded electrode is disposed in a spaced-apart relationship from the discharge end of the capillary tube so as to create a high electric field therebetween for electrostatically charging the lubricant. The lubricant is atomized and projected in the form of a steady and controlled stream of charged particles away from the discharge end of the capillary tube to within the vicinity of or all the way to the workpiece before the stream of charged particles bursts into an aerosol cloud of charged droplets for dispensing them onto the workpiece.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 2 is a detailed schematic diagram of an A.C. high voltage power supply for use in the device of FIG. 1;

FIG. 4 is an enlarged cross-sectional view of the nozzle assembly of FIG. 1; and FIG. 5 is an enlarged view of the circled area X in FIG. 4.

DESCRIPTION OF THE PREFERRED EMBODIMENTS

Figure 1:
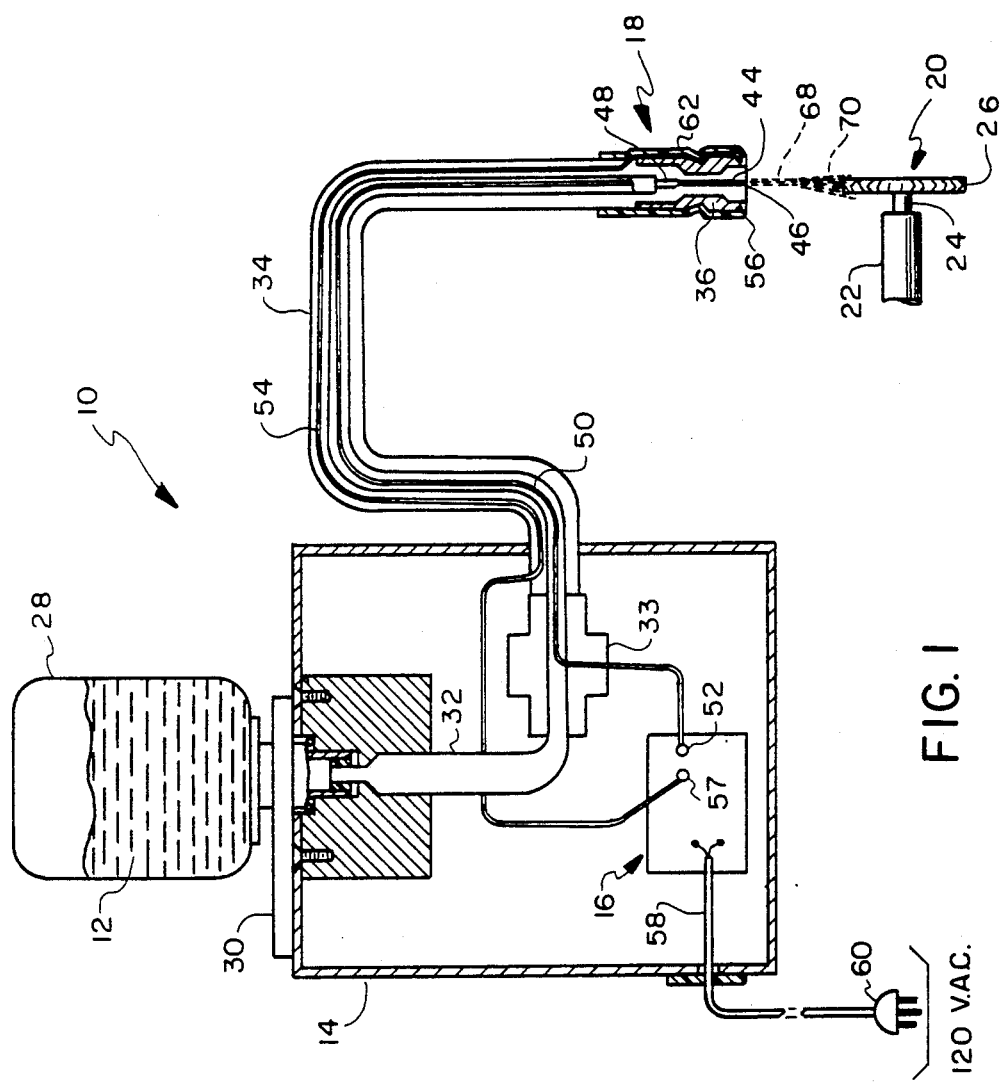
FIG. 1 is a side elevational view of a device for electrostatically charging and dispensing a high resistivity fluid to a workpiece, constructed in accordance with the principles of the present invention.

Referring now in detail to the drawings, there is shown in FIG. 1 a device for electrostatically charging and dispensing a high resistivity fluid to a workpiece, designated generally by reference numeral 10, which is constructed in accordance with the principles of the present invention. The device 10 is comprised of a source of high resistivity cutting lubricant 12, a housing 14, a high voltage power supply 16 disposed within the housing, and a nozzle assembly 18. The device 10 is used to apply electrostatically charged lubricant to the active surfaces or regions of a cutting tool such as a circular saw blade 20. The saw blade is rotated by a machine 22 having a shaft 24 which is operatively connected to the saw blade 20. The plane of the saw blade is disposed perpendicularly to the plane of the drawing. The active surfaces of the saw blade requiring lubrication are the circumference or edge portions 26 thereof.

A flexible lubricant container 28 for storing the high resistivity fluid 12 is mounted to the top wall of the housing 14 via a valve stem lock 30. The fluid is fed by gravity from the container 28 into a lubricant feed line 32. The feed line 32 passes through an electrical junction coupler 33. The lubricant feed line 3 is passed into one end of a flexible tubing or hose 34. The other end of the flexible tubing 34 has connected thereto the nozzle assembly 18. The nozzle assembly is directed towards the active regions of the cutting tool 20 at a predetermined spaced-apart distance. This distance is selected so as to provide a controlled atomization and projection of the charged droplets onto the active regions of the cutting tool 20 which may be typically in the range of two or three inches.

As previously pointed out, a high resistivity fluid is one whose resistivity is higher than $10^8$ Ohm meters. One high resistivity cutting lubricant which is suitable for the inventor's purposes is Boelube brand lubricant which is composed of a high carbon (long carbon chain) fatty alcohol manufactured by Orelube Corporation located in Plain View, N.Y. Another lubricant which may be suitable is a cetyl alcohol lubricant manufactured by Ashland Chemical Company of Columbus, Ohio under the name of Adol 520. Still another suitable lubricant may be Spermaceti. However, since the cetyl alcohol lubricant and Spermaceti are solids at room temperatures, they would have to be heated to a temperature above their melting point prior to filling of the container 28 so as to be used by the present device for electrostatically charging and dispensing of the high resistivity lubricants, which is performed in their liquid states.

As best seen from FIGS. 1, 4 and 5, the nozzle assembly 18 is formed of a generally tubular member 36 which is made of a non-conductive material such as plastic. The tubular member 36 includes a tubular passage 38 extending between a rear end 40 and a front end 42. A capillary tube 44 having a tapered discharge end forming a sharp tip or point 46 is arranged within the intermediate area of the tubular passage 38. The other or entrant end of the capillary tube is provided with integral cup-shaped connector 48. The other end of the lubricant feed line 32 is suitably joined to the connector 48 for delivering the high resistivity lubricant from the container 28 to the capillary tube 44.

The capillary tube 44 with its integral connector 48 is arranged coaxially with the tubular member 36 and extends between the rear end 40 and the front end 42 thereof. The sharp point 46 of the capillary tube is disposed to be substantially flush with the front end 42 of the tubular member. The capillary tube consists preferably of a metallic hypodermic needle with the sharp point 46 which is obtained when its thin-walled tube is cut or sliced transversely at an angle such as 10°. Alternatively, the capillary tube may be formed of a nonmetallic material and a sharp conductive needle can be inserted into its bore and extending slightly beyond the end of the capillary tube.

One end of a fine insulated wire 50 defining a high voltage electrode is positioned by the junction coupler 33 to be within the lubricant feed line 32 so as to be disposed at least partially within the interior of the capillary tube and may actually be operatively coupled or come in contact with tip 46. The wire 50 extends within the feed line 32 and the junction coupler 33 so that its other end is connected to a positive terminal pin 52 of the high voltage power supply 16 located in the housing 14. An insulated wire 54 defining a nearby grounded electrode has a fine exposed end portion 56, which is shaped into the form of a loop, attached surroundingly to the outer surface of the tubular member 36 adjacent the front end 42 and behind it. The insulated wire 54 is also extended through the flexible tubing 34 so that its other end can be connected to a negative terminal pin 57, which is suitably connected to earth ground. The nearby grounded electrode is spaced only a few eighths of an inch from the tip 46 of the capillary tube.

The nozzle assembly 18 may include an insulating sleeve or shroud 62 which is formed over the tubular member 36 with the insulated wire 54 sandwiched therebetween. The tubular member 36 may also be formed with an annular recess 64 at substantially its mid-portion and with a concaved interior area 66 of a reduced wall thickness adjacent its rear end 40 so as to facilitate a snap-fit connection with the flexible tubing 34.

The high voltage power supply may be an A.C. power supply 16a which includes a cable 58 connected by a plug 60 to a source of A.C. voltage, i.e., 120 VAC. A schematic circuit diagram of the A.C. power supply is illustrated in FIG. 2 of the drawings. The A.C. power supply 16a functions to convert the A.C. voltage to a high voltage D.C. at the output positive terminal pin 52a. The D.C. voltage is adjustable within the range of 2,500 to 3,000 volts d.c. The A.C. power supply 16a includes a potentiometer VR1 connected in series with the primary of the transformer T1 and a series connection of a diode D1 and capacitor C1 tied to the secondary of the transformer. The resistor R2 having a resistance value of 200 megohms is a safety resistor. Since this type of A.C. power supply is quite conventional and is available in the prior art, no further description is required.

Figure 3:
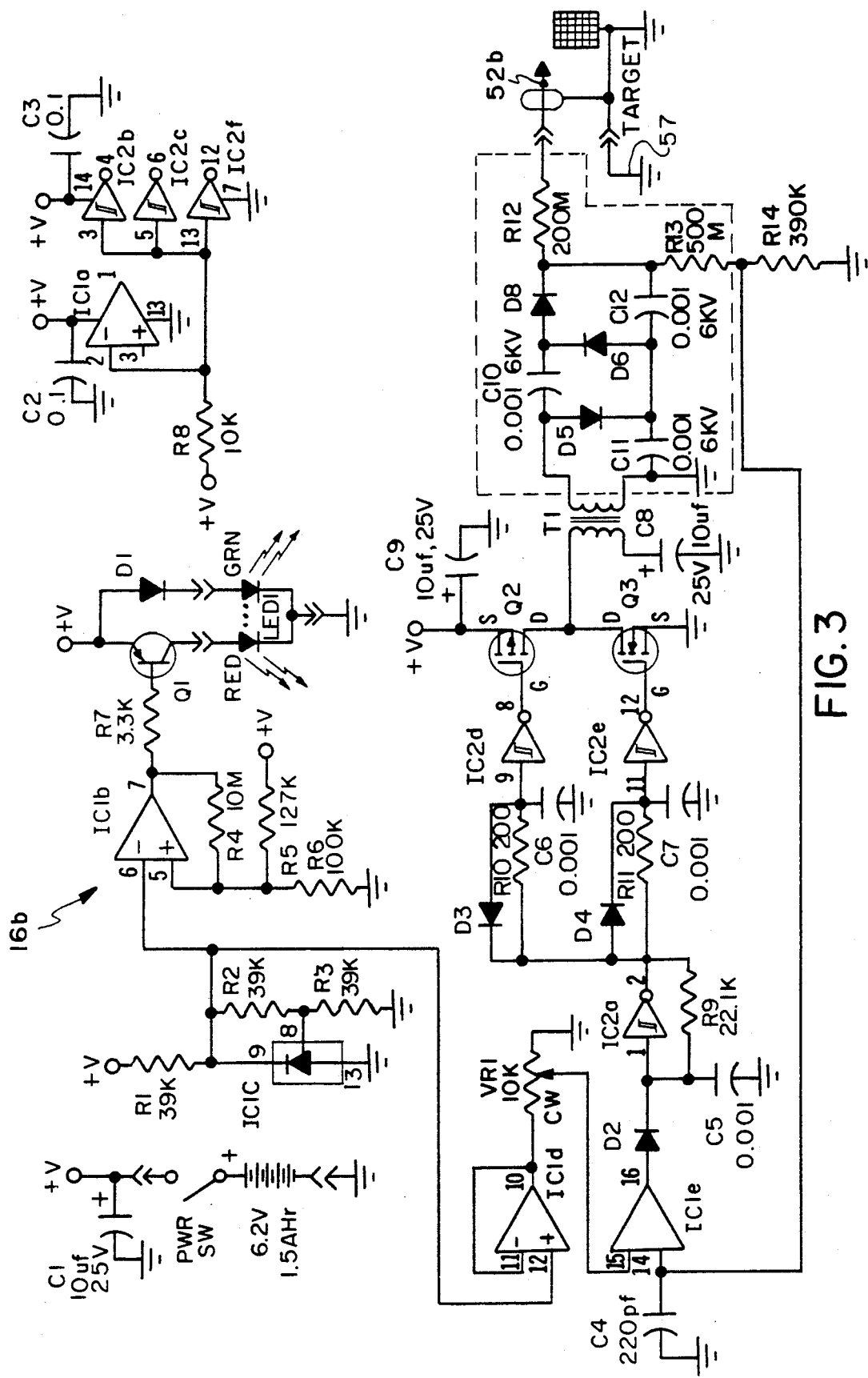
FIG. 3 is a detailed circuit diagram of a D.C. high voltage power supply for use in the device of FIG. 1.

Alternatively, the device 10 of the present invention is capable of being battery operated wherein the high voltage power supply consists of a D.C. power supply 16b. The schematic circuit diagram of the D.C. power supply is illustrated in FIG. 3. The D.C. power supply 16b functions to convert the low D.C. battery voltage (i.e., 6 volts d.c.) to a high voltage D.C. at the output positive terminal pin 52b. This high voltage D.C. is approximately 3,000 volts. The D.C. power supply 16b includes an oscillator portion powered by the low battery voltage and producing an A.C. output operated at 65 KHz. The A.C. output is converted by a transformer to a high A.C. voltage. A rectifier/voltage multiplier is used to convert the high A.C. voltage to the high voltage D.C. Since this type of A.C. power supply is quite conventional and is available in the prior art, no further description is believed to be necessary at this time.

In operation, the nozzle assembly 18 is placed approximately two or three inches from the active surfaces 26 of the cutting tool 20 to be lubricated. With the high voltage power supply being activated, the high voltage D.C. voltage of approximately 3,000 volts will be applied to the sharp tip 46 of the capillary tube 44. Thus, an electric field of high intensity is created at the sharp tip 46. The drops of liquid lubricant which appear at the sharp tip 46 are charged by induction and are disrupted by the electric field, thereby causing the liquid to atomize and be projected several inches by electrostatic repulsion in the form of a steady and controlled stream 68 of charged particles away from the atomization zone. Thereafter, the stream 68 of charged particles will be disposed in a close grouping to within the vicinity of or all the way to the active surfaces of the cutting tool before bursting into an aerosol cloud of charged droplets 70. These charged droplets will then be drawn to the active surfaces 26 of the cutting tool by electrostatic attraction.

The present invention relies upon the combination of the capillary tube 44 having the sharp tip 46 to which is applied a moderately high-voltage and a nearby grounded electrode 50 for inducing the electric charge into the high resistivity liquid. The instant device is an unexpected means for generating a steady and controlled stream of charged particles which are projected a predetermined distance through an open area to within the vicinity of or all the way to the active surfaces of the cutting tool before the stream will burst into an aerosol cloud of charged droplets. As a result, the charged droplets can be more accurately deposited onto the defined surfaces 26 of the cutting tool 20, thereby applying the lubricant in an effective and efficient manner and eliminating waste.

From the foregoing detailed description, it can thus be seen that the present invention provides method and device for electrostatically charging and dispensing a high resistivity cutting lubricant to a workpiece. The device includes a capillary tube having a tapered discharge end forming a sharp point, a high voltage electrode operatively coupled to the discharge end of the capillary tube, and a nearby grounded electrode disposed in a spaced-apart relationship from the discharge end of the capillary tube so as to create a high electric field therebetween for electrostatically charging the lubricant.

While there has been illustrated and described what is at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best mode contemplated for carrying out the invention, but that the invention will include all embodiments falling within the scope of the appended claims.

What is claimed is:

1. A device for electrostatically charging and dispensing a high resistivity cutting lubricant onto a workpiece comprising:
   a source of high resistivity cutting lubricant;
   a capillary tube having an entrant end in fluid communication with said high resistivity cutting lubricant and a tapered discharge end forming a sharp point;
   a high voltage power supply for generating a high voltage of less than 5,000 volts d.c., said power supply having a positive terminal and a negative terminal;
   a high voltage electrode having its one end connected to one of the positive and negative terminals of said power supply and having its other end operatively coupled to the discharge end of said capillary tube; and
   a nearby grounded electrode disposed in a spaced-apart relationship from the discharge end of said capillary tube so as to create a high electric field therebetween for electrostatically charging said lubricant,
   whereby said lubricant is atomized and projected in the form of a steady and controlled stream of charged particles away from the discharge end of said capillary tube to within the vicinity of or all the way to the workpiece before the stream of charged particles bursts into an aerosol cloud of charged droplets for dispensing them onto the workpiece.

2. A device as claimed in claim 1, wherein said lubricant comprises a high carbon, long carbon chain, fatty alcohol lubricant.

3. A device as claimed in claim 1, wherein said lubricant comprises Boelube brand lubricant.

4. A device as claimed in claim 1, wherein said lubricant has a resistivity greater than $10^8$ Ohm-meters.

5. A device as claimed in claim 1, wherein said grounded electrode comprises a wire loop surrounding the discharge end of said capillary tube and being positioned behind it.

6. A device as claimed in claim 5, wherein said grounded electrode is spaced less than one-half inch from the discharge end of said capillary tube.

7. A device as claimed in claim 1, wherein said high voltage is approximately 3,000 volts d.c.

8. A device as claimed in claim 1, wherein said capillary tube comprises a metallic hypodermic needle.

9. A device as claimed in claim wherein said capillary tube is formed of a non-metallic material with said high voltage electrode projecting slightly from its end.

10. A device as claimed in claim 1, wherein said high voltage power supply comprises an A.C. power supply which converts an A.C. voltage to generate said d.c. high voltage.

11. A device as claimed in claim 1, wherein said high voltage power supply comprises a D.C. power supply which includes a low d.c. battery voltage which is converted to a high A.C. voltage and a rectifier/multiplier for converting the high A.C. voltage to said d.c. high voltage.

12. A method for electrostatically charging and dispensing a high resistivity cutting lubricant onto a workpiece, comprising the steps of:
   providing a source of high resistivity cutting lubricant;
   passing said high resistivity lubricant through a capillary tube having a tapered discharge end forming a sharp point;
   applying a high voltage of less than 5,000 volts d.c. to the discharge end of said capillary tube;
   arranging a nearby grounded electrode in a spaced-apart relationship from the discharge end of said capillary tube so as to create a high electric field therebetween for electrostatically charging said lubricant; and
   atomizing and projecting said lubricant in the form of a steady and controlled stream of charged particles away from the discharge end of said capillary tube to within the vicinity of or all the way to the workpiece before the stream of charged particles bursts into an aerosol cloud of charged droplets for dispensing them onto the workpiece.

* * * * *